US009869778B2

United States Patent
Jagannathan et al.

(10) Patent No.: US 9,869,778 B2
(45) Date of Patent: Jan. 16, 2018

(54) DIGITAL RADIOGRAPHY DETECTOR

(71) Applicant: Carestream Health, Inc., Rochester, NY (US)

(72) Inventors: Seshadri Jagannathan, Rochester, NY (US); Charles M. Rankin, Penfield, NY (US); David Gruszczynski, Webster, NY (US); Jean-Marc Inglese, Bussy Saint Georges (FR); Kevin L. Bishop, Rochester, NY (US); Richard A. Lombardo, Rochester, NY (US)

(*) Notice: Subject to any disclaimer, the term of this patent is extended or adjusted under 35 U.S.C. 154(b) by 1 day.

(21) Appl. No.: 14/439,703

(22) PCT Filed: Nov. 8, 2013

(86) PCT No.: PCT/US2013/069116
§ 371 (c)(1),
(2) Date: Apr. 30, 2015

(87) PCT Pub. No.: WO2014/078184
PCT Pub. Date: May 22, 2014

(65) Prior Publication Data
US 2015/0301198 A1   Oct. 22, 2015
US 2016/0131770 A9   May 12, 2016

Related U.S. Application Data

(60) Provisional application No. 61/726,641, filed on Nov. 15, 2012.

(51) Int. Cl.
*G01T 1/203* (2006.01)
*G01T 1/20* (2006.01)
*C09K 11/77* (2006.01)
*C09K 11/02* (2006.01)
(Continued)

(52) U.S. Cl.
CPC .......... *G01T 1/2033* (2013.01); *C09K 11/02* (2013.01); *C09K 11/7771* (2013.01); *D04H 1/74* (2013.01);
(Continued)

(58) Field of Classification Search
CPC ... G01T 1/2033; G01T 1/2002; G01T 1/2018; G01T 1/201; C09K 11/02; C09K 11/7771; G21K 4/00
See application file for complete search history.

(56) References Cited

U.S. PATENT DOCUMENTS 5,334,843 A * 8/1994 Zeman ..................... G01T 1/20
250/483.1
6,359,285 B1 * 3/2002 Tasaki .................. G01T 1/2012
250/473.1
(Continued)

FOREIGN PATENT DOCUMENTS

CN         1715230 A    1/2006
CN       101646748 A    2/2010
(Continued)

OTHER PUBLICATIONS

International Search Report for International application No. PCT/US2013/069116, Mar. 18, 2014, 2 pages.

*Primary Examiner* — David Porta
*Assistant Examiner* — Mindy Vu
(74) *Attorney, Agent, or Firm* — Thompson Hine LLP

(57) ABSTRACT

Described is a scintillator screen including a plurality of filaments. Each of the plurality of filaments includes scintillating particles dispersed within a thermoplastic polymer. The thermoplastic polymer includes an elastic additive. The scintillating particles are from about 10 volume percent to about 60 volume percent of each of the plurality of filaments. Each of the plurality of filaments has a refractive index of greater than or equal to 1.5. The plurality of filaments are substantially parallel to each other and are at a volume packing of from about 60 percent to about 90 percent.

11 Claims, 5 Drawing Sheets

(51) Int. Cl.
*G21K 4/00* (2006.01)
*D04H 1/74* (2006.01)

(52) U.S. Cl.
CPC ............ *G01T 1/201* (2013.01); *G01T 1/2002* (2013.01); *G21K 4/00* (2013.01); *D10B 2321/022* (2013.01); *D10B 2509/00* (2013.01); *G21K 2004/08* (2013.01)

(56) References Cited

U.S. PATENT DOCUMENTS

| | | |
|---|---|---|
| 2005/0274895 A1 | 12/2005 | Jiang et al. |
| 2006/0202125 A1 | 9/2006 | Suhami |
| 2008/0035852 A1* | 2/2008 | Nagata .................. G01T 1/2002 250/370.11 |
| 2009/0302226 A1* | 12/2009 | Schieber .................... G01T 3/08 250/370.02 |
| 2011/0133093 A1 | 6/2011 | Jagannathan et al. |
| 2012/0043062 A1 | 2/2012 | Tada et al. |
| 2013/0001471 A1* | 1/2013 | Srivastava ............ C09K 11/025 252/301.6 P |
| 2013/0177773 A1* | 7/2013 | Aylward ............. B32B 37/1207 428/446 |

FOREIGN PATENT DOCUMENTS

| | | |
|---|---|---|
| EP | 1 518 913 | 3/2005 |
| KR | 2010-0052612 A | 5/2010 |
| WO | 00/58755 | 10/2000 |
| WO | 02/056071 | 7/2002 |
| WO | 2009/008911 | 1/2009 |

* cited by examiner

DIGITAL RADIOGRAPHY DETECTOR

CROSS REFERENCE TO RELATED APPLICATIONS

This application claims the benefit of and is a U.S. National Phase filing of PCT Application PCT/US13/69116 filed Nov. 8, 2013 entitled "DIGITAL RADIOGRAPHY DETECTOR", in the name of Seshadri Jagannathan et al, which claims the benefit of U.S. Provisional application Ser. No. 61/726,641, filed on Nov. 15, 2012, entitled "RADIATION SENSING SCREENS GENERATED USING AN ASSEMBLY OF SCINTILLATING THERMOPLASTIC FIBERS", in the names of Seshadri Jagannathan, et al., which is incorporated herein by reference in its entirety.

BACKGROUND

Field of Invention

The present invention relates to scintillator screens for use in digital radiography.

Background

Systems for acquiring radiographic images are widely used in medical and dental care. Due to recent advances in component miniaturization, data transmission and processing speed with improved image processing and display capabilities, apparatus and methods for obtaining radiographic images directly in digital format are increasingly being used. With digital radiography, the radiation image exposures captured on radiation-sensitive phosphor layers are converted, pixel by pixel, to electronic image data, which is then stored in memory circuitry for subsequent read-out and display on suitable electronic image display devices.

In typical digital radiography of the indirect type, a radiation sensing material, more generally termed a phosphor layer or scintillator, converts incident x-rays to visible light, which is then detected by a photosensor array that converts light intensity information to a corresponding electronic image signal.

Columnar, thallium doped cesium iodide (CsI) phosphors are widely used in scintillator screens in digital radiography. Thallium doped CsI provides an excellent combination of high x-ray absorptivity over a wide energy range, and high scintillation efficiency, while the columnar structure allows for a maintaining high spatial resolution at high x-ray stopping power. As a result, from an image quality perspective, these columnar, thallium doped CsI screens are used in many radiographic applications.

It is generally accepted that these CsI based columnar scintillator screens have the potential to provide the highest spatial resolution needed for any radiographic application. However, it is difficult to fully realize this potential in practical applications due the mechanical and environmental fragility of CsI. CsI crystals are highly water-soluble and hence these scintillators must to be maintained in sealed environments. Further, CsI crystals are columnar structures and are mechanically fragile requiring shock resistant containers. As a result the cost structure is quite high for applications using columnar CsI scintillator screens.

As a result scintillator screens having an image quality approaching that of columnar, thallium doped CsI scintillator screens, and are significantly less costly or less sensitive to mechanical shock and environmental conditions are desired.

SUMMARY

According to an embodiment, there is provided a scintillator including a plurality of filaments. Each of the plurality of filaments includes scintillating particles dispersed within a thermoplastic polymer. The thermoplastic polymer includes an elastic additive. The scintillating particles are from about 10 volume percent to about 60 volume percent of each of the plurality of filaments. Each of the plurality of filaments has a refractive index of greater than or equal to 1.5. The plurality of filaments are substantially parallel to each other and are at a volume packing of from about 60 percent to about 90 percent.

According to another embodiment, there is provided a digital radiography panel. The digital radiography panel includes a scintillator screen. The scintillator screen includes a plurality of filaments, wherein each of the plurality of filaments includes scintillating particles dispersed within a polymer. The polymer includes a polyolefin and an elastic additive, wherein the scintillating particles are from about 10 volume percent to about 60 volume percent of each of the plurality of filaments. Each of the plurality of filaments has a refractive index of greater than or equal to 1.5. The plurality of filaments are substantially parallel to each other at a volume packing of from about 60 percent to about 90 percent. The digital radiography panel includes a flat panel detector disposed on the scintillator screen.

There is provided a scintillator screen including a plurality of filaments having a core and a shell surrounding the core. The core of each of the plurality of filaments includes scintillating particles dispersed within a polymer, wherein the polymer includes a polyolefin and an elastic additive. The scintillating particles are from about 10 volume percent to about 60 volume percent of the core of each of the plurality of filaments. The shell of the plurality of filaments has a refractive index of greater than or equal to 1.5. The plurality of filaments are substantially parallel to each other at a volume packing of from about 60 percent to about 90 percent.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
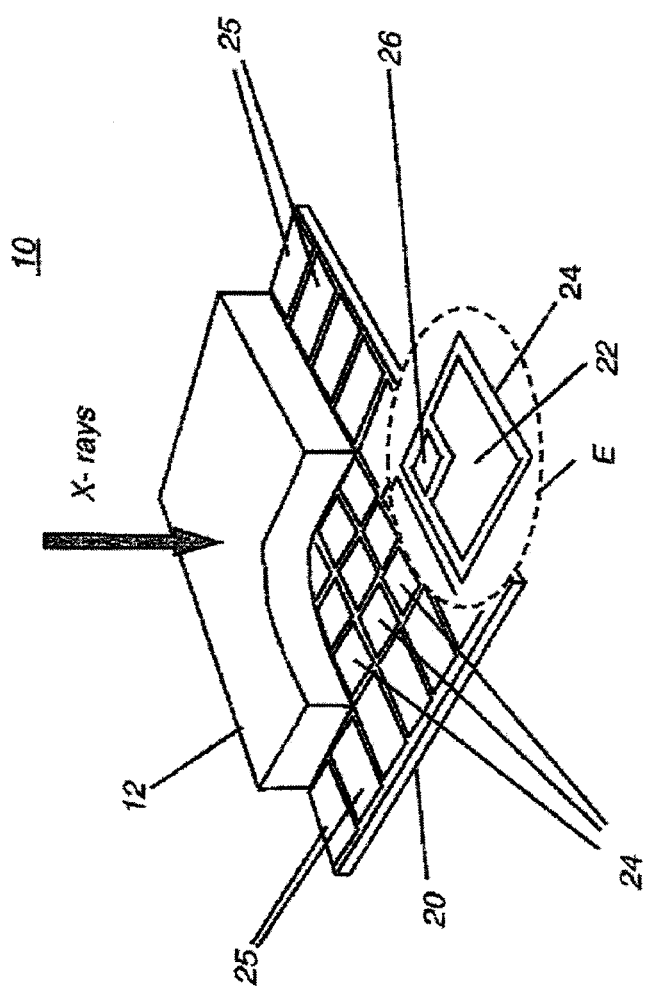
FIG. 1 is a schematic illustration of a digital radiographic detector.

It should be noted that some details of the FIGS. have been simplified and are drawn to facilitate understanding of the embodiments rather than to maintain strict structural accuracy, detail, and scale.

DESCRIPTION OF EXEMPLARY EMBODIMENTS

U.S. provisional Patent Application No. 61/726,641, filed Nov. 15, 2012, entitled RADIATION SENSING SCREENS GENERATED USING AN ASSEMBLY OF SCINTILLATING THERMOPLASTIC FIBERS, is hereby incorporated by reference in its entirety.

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

In the context of the application, the term "optical contact" has its conventional meaning as understood by those skilled in the optical arts. Optical contact between two surfaces along a light path is considered to be "airtight" physical and optical contact between the two surfaces. In conventional, glueless optical contact, two surfaces are in intimate physical contact without an intervening cement or adhesive.

In the context of the application, the terms "radiation sensing material", "scintillator screen", "scintillator layer", "scintillator element", and "phosphor layer" are interchangeable, each referring to the component of a digital radiography detector that acts as a radiation sensing element that, upon irradiation at a given level of radiation, is excitable to emit a corresponding radiation of lower energy, the intensity of which is proportional to the intensity of the incident radiation. The emitted radiation may be emitted spontaneously or upon stimulation, such as upon stimulation with optical, thermal, or electrical energy.

In the context of the present disclosure, the term "digital radiography detector" is considered to encompass both digital radiography (DR) detectors of the indirect type and computed radiography (CR) detectors that include an array of photosensors bonded to the radiation sensing layer that, upon receipt of an external excitation or stimulation energy, emits light energy corresponding to the amount of received x-ray radiation energy.

Certain exemplary methods and/or apparatus embodiments according to the application can provide an improved digital radiography detector by providing a scintillating screen that is bonded to fiber optic array or directly to a detector array.

Certain exemplary methods and/or apparatus embodiments according to the application can provide a scintillating screen that is less expensive and/or more environmentally resistant than conventional columnar CsI screens.

The perspective view of FIG. 1 shows a partial cutaway view of a small edge portion of a digital radiography (DR) detector 10 of the indirect type. A scintillating screen 12, or phosphor layer formed from radiation sensing materials, responds to incident x-ray radiation at a higher energy level by generating visible light at a lower energy level that is, in turn, detected by a detector array 20. An optional fiber optic array, disclosed in U.S. Pat. No. 8,399,842 and incorporated in its entirety by reference herein, can be provided for directing light from scintillating screen 12 toward detector array 20. Detector array 20 has a two-dimensional array having many thousands of radiation sensitive pixels 24 that are arranged in a matrix of rows and columns and are connected to a readout element 25. As shown at enlarged section E, each pixel 24 has one or more photosensors 22 and includes an associated switch element 26 of some type.

To read out image information from the panel, each row of pixels 24 is selected sequentially and the corresponding pixel in each column is connected in its turn to a charge amplifier (not shown). The outputs of the charge amplifiers from each column are then applied to other circuitry that generates digitized image data that can then be stored and suitably processed as needed for subsequent storage and display.

Figure 2:
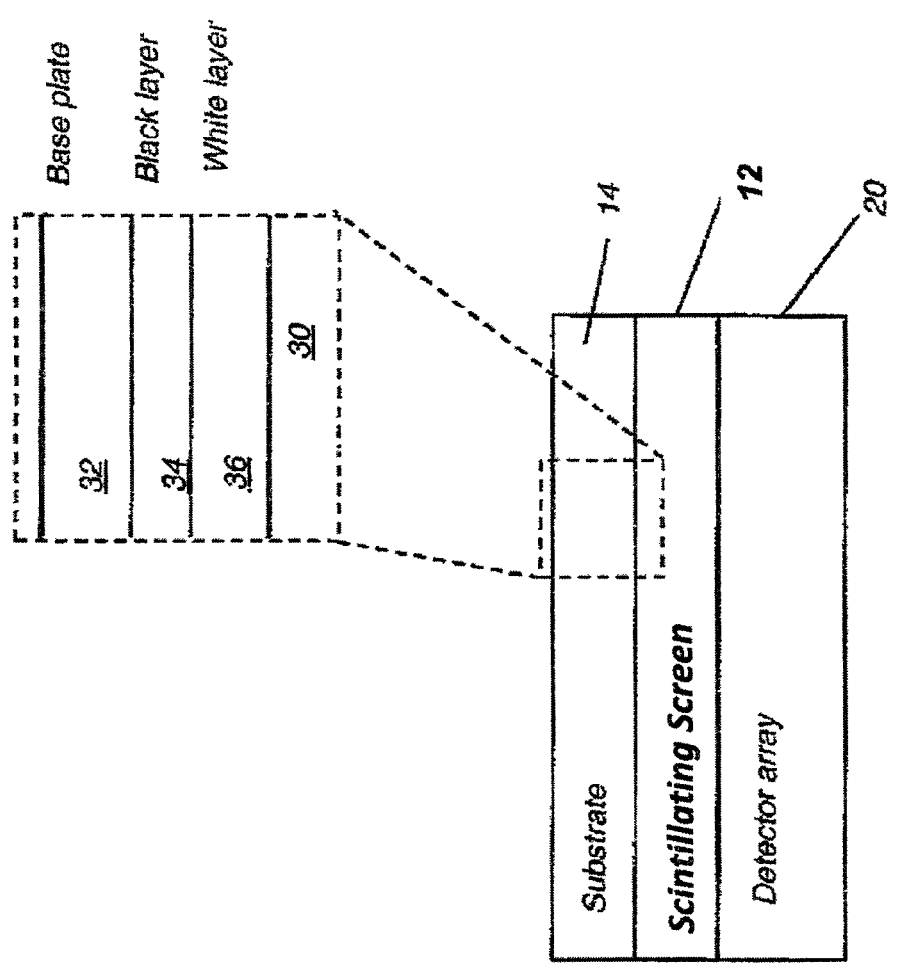
FIG. 2 is a cross-sectional view of a digital detector device according to one embodiment disclosed herein.

FIG. 2 also shows exemplary support layers that can be considered as part of substrate 14 in various embodiments of the application. A base plate 32 provides a supporting surface for a carbon-pigmented black layer 34 for absorbing light leakage and reducing scattering effects. Black layer 34 is overlaid onto a pigmented white layer 36. White layer 36 reflects some portion of the scattered light back through, scintillating screen 12.

Scintillating screen 12 in FIG. 2 includes a plurality of filaments affixed together. The filaments contain phosphor particles. The phosphor particles are gadolinium oxide phosphor GOS:Tb in one embodiment. In general, the phosphor that is used can be any particulate substance that converts x-rays of the energy appropriate to the imaging task to visible light of an energy appropriate for sensing by the photosensors of detector array 20 and, optionally, for transmission to detector array 20 by the fiber optic elements. The transformation of higher energy x-ray light to lower energy (visible or other) light can be spontaneous or in response to stimulating energy from an external source, which may apply a third energy level of optical, thermal, electrical, or other type. Scintillator screen 12 can have a supporting substrate 14 that serves as an optional carrier or backing layer, as shown in FIG. 2.

Disclosed herein is composite scintillator screen which contains the phosphors or scintillating materials. Columnar scintillator screen structure embodiments can be provided by providing a plurality of filaments to form the scintillator screen. The filaments can include scintillator particles dispersed in a polymer with a refractive index greater than or equal to 1.5. The filaments are formed by extrusion and winding onto a core. After winding the filaments on a core, the filaments are affixed to each other. The wound core is sliced to form scintillator screens. The refractive index is less than 1.3 in the space between the filaments. The space between the filaments can be air (refractive index=1), or any other material with a refractive index less than 1.3.

The scintillator screen is manufactured by dispersing the appropriate scintillator particles in a thermoplastic polymer matrix by melt compounding. The thermoplastic polymer matrix having the dispersed scintillator particles is extruded and stretched to form a filament that can be wound on a spool or core. The filaments are affixed together. The assembly is sliced, polished and assembled to form a scintillator screen for use in a detector panel.

Figure 3:
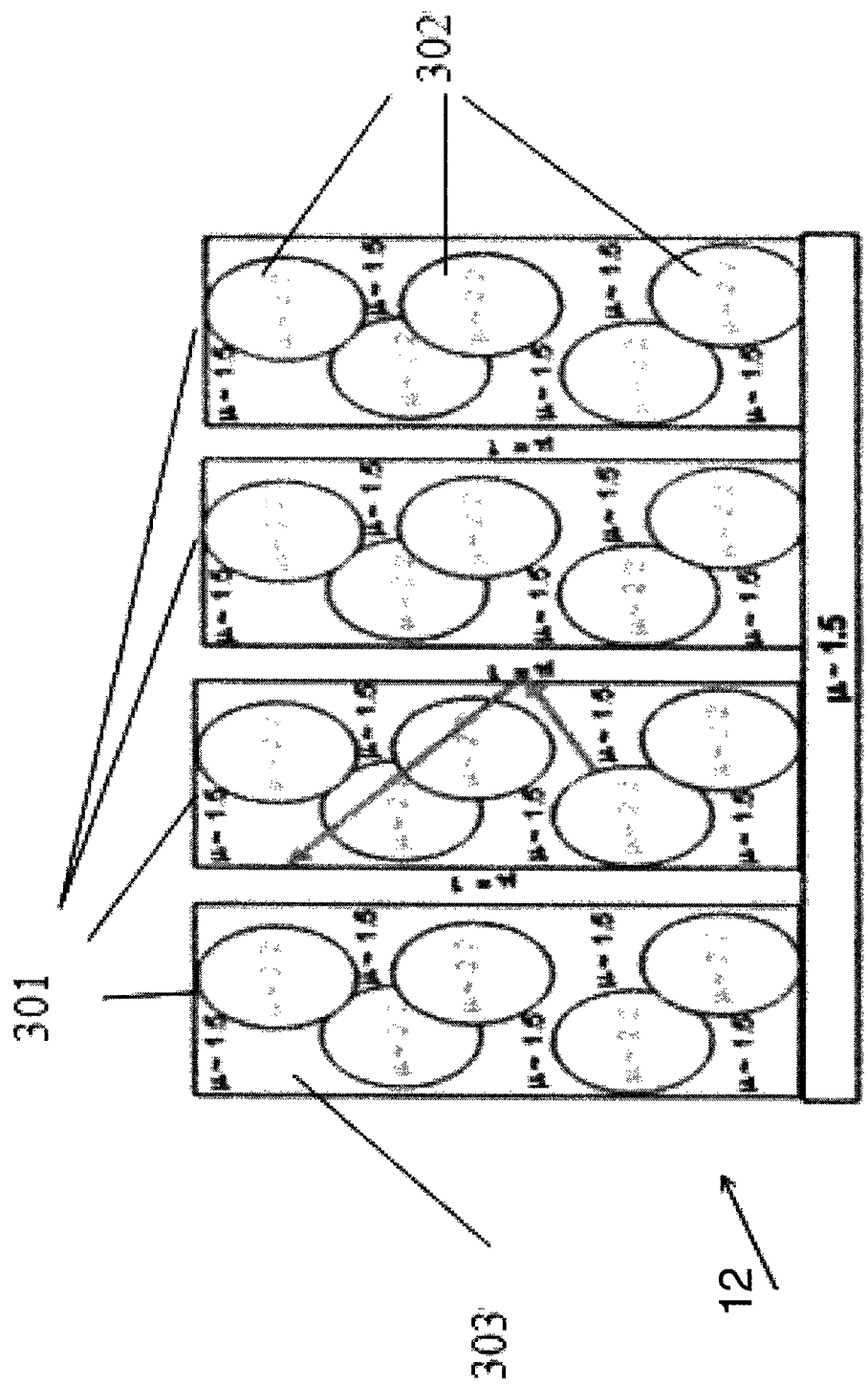
FIG. 3 is a cross-sectional view of a scintillator screen disclosed herein.

Shown in FIG. 3 is a sectional view of a scintillator screen 12. The scintillator screen includes a plurality of filaments 301 that are arranged parallel to each other. The filaments 301 includes a thermoplastic polymer 303 having scintillator particles 302 dispersed therein. The filament 301 is surrounded by air (refractive index 1.0) or another material having a refractive index of less than 1.3. The scintillator particles shown in FIG. 3 have a refractive index of about 2.

The scintillator screen disclosed herein overcomes a fundamental limitation of the earlier attempts at creating columnar filaments by filling hollow tubes with scintillator particles. Such a process creates microvoids or micro wells, which resulted in partial filling of the cavity with the scintillator particles and any other additive (organic, inorganic or polymeric) that is included with the scintillator particles. Irrespective of the method of filling, and the presence or absence of any additives, the cavity always had air voids, which violates the requirements for total internal reflection of greater than 1.5, as air has a refractive index of 1.0.

The phosphors 302 dispersed as a particulate in the polymeric matrix 303 include rare-earth oxysulfides doped with a rare-earth activator. Suitable phosphors such as $Gd_2O_2S$:Tb, $Gd_2O_2S$:Eu, $Gd_2O_3$:Eu, $La_2O_2S$:Tb, $La_2O_2S$, $Y_2O_2S$:Tb, CsI:Tl, CsI:Na, CsBr:Tl, NaI:Tl, $CaWO_4$, $CaWO_4$:Tb, BaFBr:Eu, BaFCl:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, and $(Y,Gd)BO_3$:Eu, or combinations thereof can be used in the filaments of the scintillator screen disclosed herein. In embodiments, gadolinium oxy sulfides $Gd_2O_2S$:Tb, $Gd_2O_2S$:Eu, $Gd_2O_3$:Eu are preferred. However, any suitable prompt emitting phosphor material, including doped phosphor materials, can be used in any of the embodiments described herein. A blend of different phosphors can also be used. The median particle size of the phosphor particle is generally between about 50 nm to 5 microns. A median particle size of between 100 nm and 1 micron is preferred for ease of manufacturing.

Figure 4:
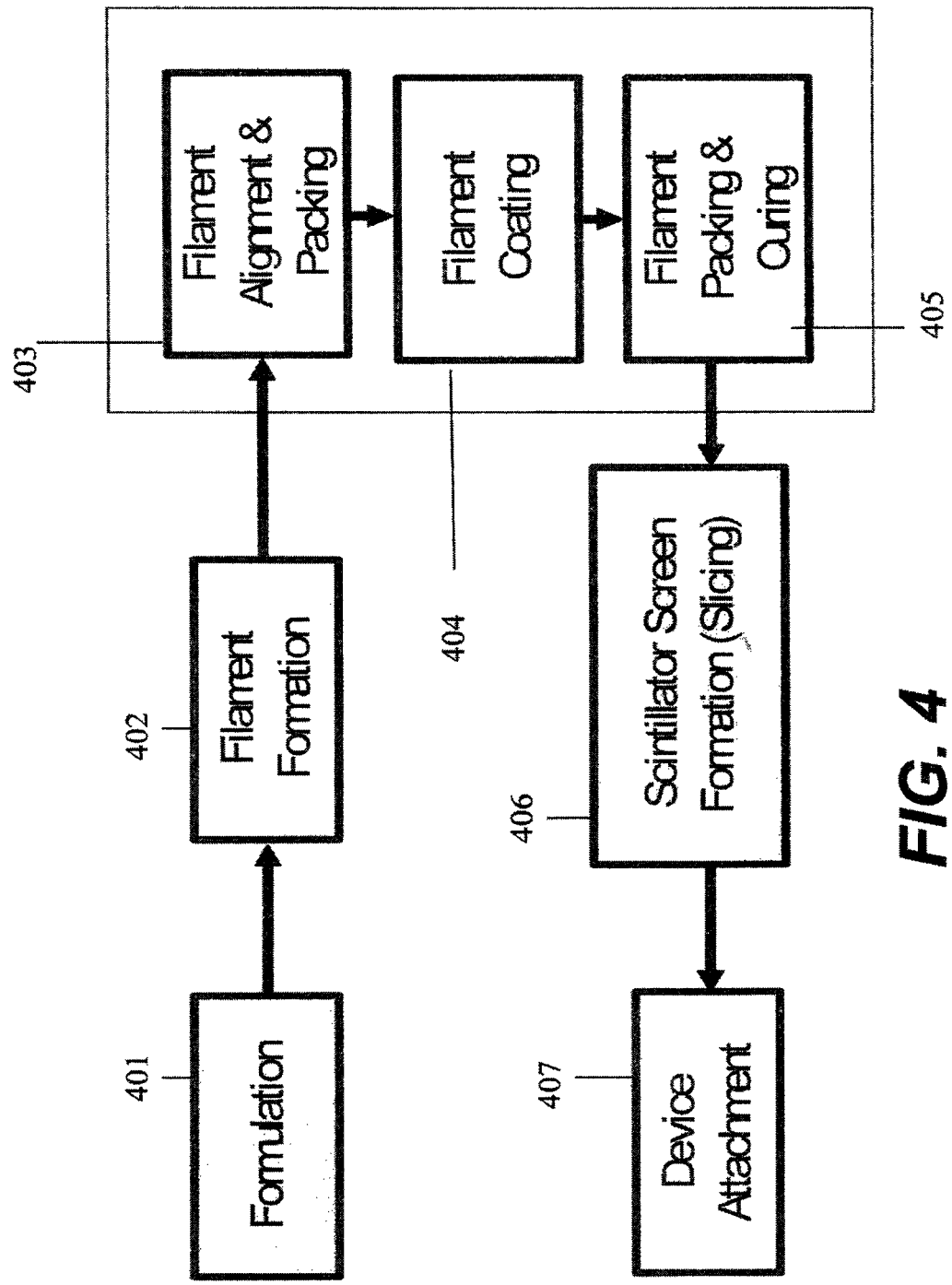
FIG. 4 is a flow chart of the process used to manufacture scintillator screens disclosed herein.

The scintillating screen 12 (FIGS. 1, 2 and 3) can be prepared as shown in the flow chart in FIG. 4. A formulation of scintillator particles, polymer, elastic additive and optional additives is loaded into an extruder (401). The extruder can be single screw or twin screw. After mixing and heating the formulation in the screw(s), the formulation is extruded through a die to form a filament (402) having a diameter of about 10 microns to about 40 microns in diameter. The filament is wound (403) on a core. One or more filaments can be wound simultaneously. The final diameter of the core can be any size. For the screens discussed in the Examples, the core was about 3.5 inches to about 8.5 inches. The size is dependent on the size of the scintillating screen being prepared. The winding of the filament is aligned so that the packing density of the filament is as high as possible. The filament(s) on the core are affixed together (404). The affixing of the filament(s) can be accomplished by coating or fusing with an adhesive such as an epoxy or other material to securely hold the wound filament. The adhesive or other material is cured (405). A scintillator screen is formed by slicing the core along its axis (406). The thickness of the slice is from 200 microns to about 1000 microns in embodiments. The scintillator screen is then attached to a detector device (407). In certain embodiments, the slice is polished sizing to the correct dimension is done before final assembly. Final assembly includes applying an adhesive and bonding the base plate and detector.

In order to manufacture the scintillator screen 12, it is necessary that the filaments can be extruded to diameters of from about 10 microns to about 40 microns or in embodiments from 10 microns to 30 microns. One way to determine whether the polymer and phosphor particles are suitably elastic is the storage modulus (C). The storage modulus G' in viscoelastic solids measures the stored energy, representing the elastic portion, and the energy dissipated as heat, representing the viscous portion. Polymer compositions are often rated by their storage modulus. It has been discovered by the inventors that a composition of a thermoplastic polymer, an elastic additive and phosphor particles that has a storage modulus G' of greater than 1000 dynes/cm is extrudable into filaments having a diameter of from about 10 microns to about 30 microns.

The thermoplastic polymer is selected from the group of polyolefins including polyethylene, polypropylene and polybutylene. The thermoplastic polymer includes an additive for promoting elasticity. The additive is selected from alkylene vinyl acetates including ethylene vinyl acetate, propylene vinyl acetate and butylene vinyl acetate. In embodiments, the weight ratio of thermoplastic polymer to elastic additive is from about 95:5 to about 80:20. In embodiments, the vinyl acetate content of the alkylene vinyl acetate is greater than about 25 weight percent based on the total weight of the composition.

The amount of scintillating particles in the extruded filaments is from about 10 volume percent to about 60 volume percent. Unexpectedly, the addition of scintillating particles to the composition of the thermoplastic polymer and elastic additive increased the storage modulus of the composition.

In embodiments, additives such as surfactants, adhesion promoters can be added to the composition. The amount of these additives is from about 0 weight percent to about 2 weight percent of the composition. Suitable surfactants include dioctyl sodium sulfosuccinate (referred to as AOT), sodium dodecyl sulfate (SDS) and fluorinated surfactants. Adhesion promoters include magnesium stearate, calcium stearate and potassium behenate.

The filament volume packing density of the scintillating screens is from about 50 percent to about 90 percent. The volume packing density is the percent area of the scintillating screen that the filaments cover. For cylindrical filaments, the maximum volume packing density is about 90 percent. The length of the filaments is from about 100 microns to about 1,000 microns. This is the approximate thickness of the scintillator screen.

In embodiments the filaments can have a core shell structure wherein a shell surrounds the filament core. The shell and core are extruded together. The shell is provided with a higher refractive index than the core to enhance the light piping of the filaments. The shell can contain metal salts, ionic surfactants and polymeric surfactants. The thickness of the shell is from about 1 micron to about 10 microns. The thickness of the core is from about 10 microns to about 25 microns. The shell can contain the same additives surfactants and adhesion promoting agents as included in the core and listed previously.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and/or advantageous for any given or particular function. Further, in the discussion and claims herein, the term "exemplary" indicates the description is used as an example, rather than implying that it is an ideal.

EXAMPLES

Scintillator Screens

Scintillator screens were manufactured by compounding polypropylene (available from Exxon Mobil), gadolinium oxy sulfide phosphor (available from Nichia), ethylene vinyl acetate (available from Elvax), surfactant and an adhesion promoter (Magnesium stearate). The weight ratio of phosphor particles to binder was about 2 parts phosphor to about 1 part polymer binder. The acetate content of the ethylene vinyl acetate was about 28 percent. The amount of additives (AOT and magnesium stearate) was less than 1 weight percent. The compounded formulation was extruded using a Microtruder hot melt extruder available from Rand Castle. The extruded filaments were wound on a spool. The filament bundle was dipped in epoxy and cured to fuse the filaments. The bundle was cut using an Accutom precision saw to form the scintillator screen. These are identified as ID 1 and ID 2 in Table 1.

A scintillator screen having core shell filaments was prepared. The core composition was the same as in ID 1 and 2. The shell composition was the same as the core composition excluding the phosphor particles. The core composition and shell composition were compounded separately and extruded through a coextrusion die using the Microtruder hot melt extruder available from Rand Castle. A DRZ screen available from Mitsubishi was used for comparison. These are identified DRZ in Table 1. The DRZ screen contains phosphor particles dispersed in a polymer. This are identified as ID 3 in Table 1.

The results and performance of the various screens are summarized in Table 1.

TABLE 1

| ID | Core Diameter (μm) | Shell thickness (μm) | Screen thickness (μm) | Screen resolution (LP/mm) | Screen Absorbance $A = (2 - \log_{10} \% T)$ | Screen Absorbance wrt DRZ | Speed wrt DRZ |
|---|---|---|---|---|---|---|---|
| 1 | 22 | N/A | 212 | 7.0 | 0.05 | 13% | 14% |
| 2 | 29 | N/A | 341 | 4.5 | 0.10 | 29% | 23% |
| 3 | 30 | 5 | 571 | 4.0 | 0.09 | 26% | 17% |
| DRZ | N/A | N/A | 208 | 4.5 | 0.35 | 100% | 100% |

The experimental data shows that the speed increases with increasing x-ray absorbance, while the resolution performance of the screens generated disclosed herein having a thickness of from about 212 microns to about 341 microns appears to be equivalent or better than the DRZ+ screen which has a thickness of 208 microns. In addition the DRZ+ screens are manufactured by solvent coating which is an environmental issue. The performance is due to light piping in fibers within the screens generated from fiber bundles which limits the lateral spread of the light generated by the scintillator particles. The light piping advantage is not available in the solvent coated DRZ+ screens. As a result it is possible to generate scintillator screens using the fiber bundles that are nearly twice the thickness of the solvent coated screens, without significant loss in the resolution performance. The screens disclosed herein are more easily tuned as the x-ray absorbance of the screens can be adjusted by increasing or decreasing the scintillator particle loading and the screen thickness.

Figure 5:
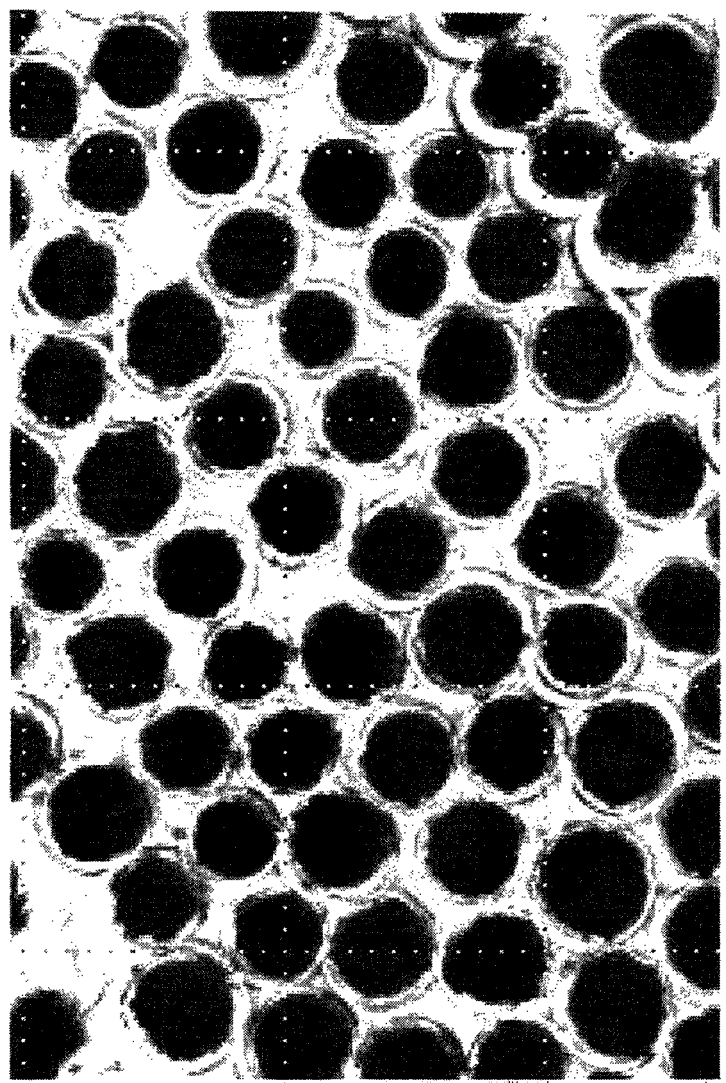
FIG. 5 is a cross-sectional image of the scintillator screen disclosed herein.

Shown in FIG. 5 is a cross-sectional micrograph of scintillator screen ID. 3. The darker core represents the phosphor loaded filaments and the lighter shell represents the phosphor free, polymer shell and the intervening region between the core/shell fibers is the epoxy resin holding the fibers together.

Certain exemplary methods of manufacturing scintillator screen embodiments can include extruding a mixture of scintillating particles a polyolefin and an elastic additive to form one or more filaments having a diameter of from about 10 microns to about 40 microns; winding the one or more filaments on a core to form a cylinder; affixing the one or more wound filaments to each other; slicing the cylinder along an axis of the core to form a slice having a thickness of from 100 to 1000 microns to form the scintillator screen. Certain exemplary methods of manufacturing digital radiograph panel embodiments can include extruding a mixture of scintillating particles a polyolefin and an elastic additive to form one or more filaments having a diameter of from about 10 microns to about 40 microns; winding the one or more filaments on a core to form a cylinder; affixing the one or more wound filaments to each other; slicing the cylinder along an axis of the core to form a slice having a thickness of from 100 to 1000 microns to form a scintillator screen; attaching a substrate to a back side of the scintillator screen, the substrate comprising a black layer and a white layer; and attaching a flat panel detector to a front side of the scintillator screen. Certain exemplary methods of manufacturing scintillator screen embodiments can include extruding a mixture of scintillating particles polypropylene and ethylene vinyl acetate to form one or more filaments having a diameter of from about 10 microns to about 40 microns, wherein the polypropylene and the ethylene vinyl acetate are present in a ratio of from about 95 to 5 to about 80 to 20, wherein the scintillating particles comprise from about 10 volume percent to about 60 volume percent of the one or more filaments; winding the one or more filaments on a core to form a cylinder; affixing the one or more wound filaments to each other; slicing the cylinder along an axis of the core to form a slice having a thickness of from 100 to 1000 microns to form the scintillator screen. In one embodiment, the polyolefin can be selected from the group consisting of: polyethylene, polypropylene and polybutylene. In one embodiment, the one or more filaments can have a storage modulus greater than or equal to 1000 dynes/cm. In one embodiment, the elastic additive can include alkylene vinyl acetate. In one embodiment, the polyolefin and the elastic additive can be present in a ratio of from about 95 to 5 to about 80 to 20 in each of the one or more of filaments. In one embodiment, the scintillating particles can include from about 10 volume percent to about 60 volume percent of the one or more filaments. In one embodiment, each of the one or more filaments has a refractive index of greater than or equal to 1.5. Some embodiments can further include polishing the slice. In one embodiment, the scintillator particles are selected from the group consisting of: $Gd_2O_2S$:Tb, $Gd_2O_2S$:Eu, $Gd_2O_3$:Eu, $La_2O_2S$:Tb, $La_2O_2S$, $Y_2O_2S$:Tb, CsI:Tl, CsI:Na, CsBr:Tl, NaI:Tl, $CaWO_4$, $CaWO_4$:Tb, BaFBr:Eu, BaFCl:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, and $(Y,Gd)BO_3$:Eu. Some exemplary embodiments can further include polishing the slice prior to attaching the substrate or attaching the flat panel detector. Certain exemplary methods of manufacturing scintillator screen embodiments can include extruding a mixture of scintillating particles polypropylene and ethylene vinyl acetate to form one or more filaments having a diameter of from about 10 microns to about 40 microns, wherein the polypropylene and the ethylene vinyl acetate are present in a ratio of from about 95 to 5 to about 80 to 20, wherein the scintillating particles comprise from about 10 volume percent to about 60 volume percent of the one or more filaments; winding the one or more filaments on a core to form a cylinder; affixing the one or more wound filaments to each other; slicing the cylinder along an axis of the core to form a slice having a thickness of from 100 to 1000 microns to form the scintillator screen.

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

The invention claimed is:

1. A scintillator screen comprising:
a plurality of melt compounded and extruded filaments, wherein each of the plurality of filaments includes prompt emitting phosphor scintillating particles dispersed within a thermoplastic polymer, wherein the thermoplastic polymer includes an elastic additive, wherein the scintillating particles are from about 10 volume percent to about 60 volume percent of each of the plurality of filaments, wherein each of the plurality of filaments has a refractive index of greater than or equal to 1.5, and wherein the plurality of filaments are substantially parallel to each other and at a volume packing of from about 60 percent to about 90 percent.

2. The scintillator screen according to claim 1, wherein each of the plurality of filaments have a diameter of from about 10 microns to about 40 microns.

3. The scintillator screen according to claim 1, wherein the plurality of filaments have a storage modulus greater than or equal to 1000 dynes/cm$^2$.

4. The scintillator screen according to claim 1, wherein each of the plurality of filaments have a length of from about 100 microns to about 1 mm, wherein the thermoplastic polymer is selected from the group consisting of: polyethylene, polypropylene and polybutylene.

5. The scintillator screen according to claim 1, wherein the elastic additive comprises alkylene vinyl acetate, wherein the thermoplastic polymer and the alkylene vinyl acetate are present in a ratio of from about 95 to 5 to about 80 to 20 in each of the plurality of filaments.

6. The scintillator screen according to claim 1, wherein the scintillator particles are selected from the group consisting of: $Gd_2O_2S$:Tb, $Gd_2O_2S$:Eu, $Gd_2O_3$:Eu, $La_2O_2S$:Tb, $La_2O_2S$, $Y_2O_2S$:Tb, CsI:Tl, CsI:Na, CsBr:Tl, NaI:Tl, $CaWO_4$, $CaWO_4$:Tb, BaFBr:Eu, BaFCl:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, and $(Y,Gd)BO_3$:Eu, wherein the scintillator particles have a size of from about 50 nm to about 15 microns.

7. The scintillator screen according to claim 1, further comprising:
a flat panel detector disposed on the scintillator screen; and
a substrate layer disposed on the scintillator screen opposite the flat panel detector, wherein the substrate layer includes a base plate, a black layer and a white layer.

8. A scintillator screen comprising:
a plurality of melt compounded and extruded filaments having a core and a shell surrounding the core, wherein the core of each of the plurality of filaments includes prompt emitting phosphor scintillating particles dispersed within a polymer, wherein the polymer includes a polypropylene and an elastic additive, wherein the scintillating particles are from about 10 volume percent to about 60 volume percent of each of the plurality of filaments, wherein the shell of the plurality of filaments does not include prompt emitting phosphor scintillating particles and has a refractive index of greater than or equal to 1.5, wherein the plurality of filaments have a storage modulus greater than or equal to 1000 dynes/cm$^2$, and wherein the plurality of filaments are substantially parallel to each other at a volume packing of from about 60 percent to about 90 percent.

9. The scintillator screen according to claim 8, wherein the shell has a thickness of from about 1 micron to about 10 microns.

10. The scintillator screen according to claim 8, wherein the elastic additive comprises alkylene vinyl acetate, wherein the polypropylene and elastic additive comprise a weight ratio of from about 95:5 to about 80:20.

11. A scintillator screen comprising:
a plurality of fibers having a core and a shell surrounding the core, wherein the core of each of the plurality of fibers includes prompt emitting phosphor scintillating particles dispersed within a thermoplastic polyolefin, where the thermoplastic polyolefin includes an elastic additive, where the elastic additive is an alkylene vinyl acetate, wherein the scintillating particles are from about 10 volume percent to about 60 volume percent of each of the plurality of fibers, wherein the shell of the plurality of fibers does not include prompt emitting phosphor scintillating particles and has a refractive index of greater than or equal to 1.5, and wherein the plurality of fibers are substantially parallel to each other at a volume packing of from about 60 percent to about 90 percent.

* * * * *